J. P. TARBOX.
ASSEMBLY FORM FOR AEROPLANE WINGS.
APPLICATION FILED DEC. 15, 1915.
1,271,386.
Patented July 2, 1918.
2 SHEETS—SHEET 1.
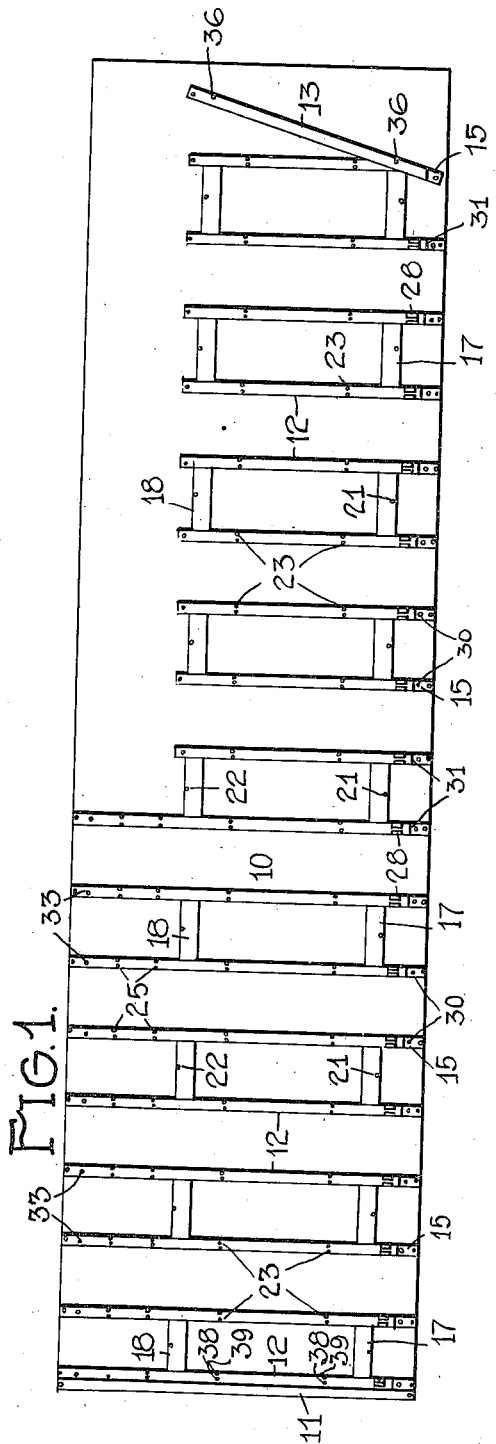
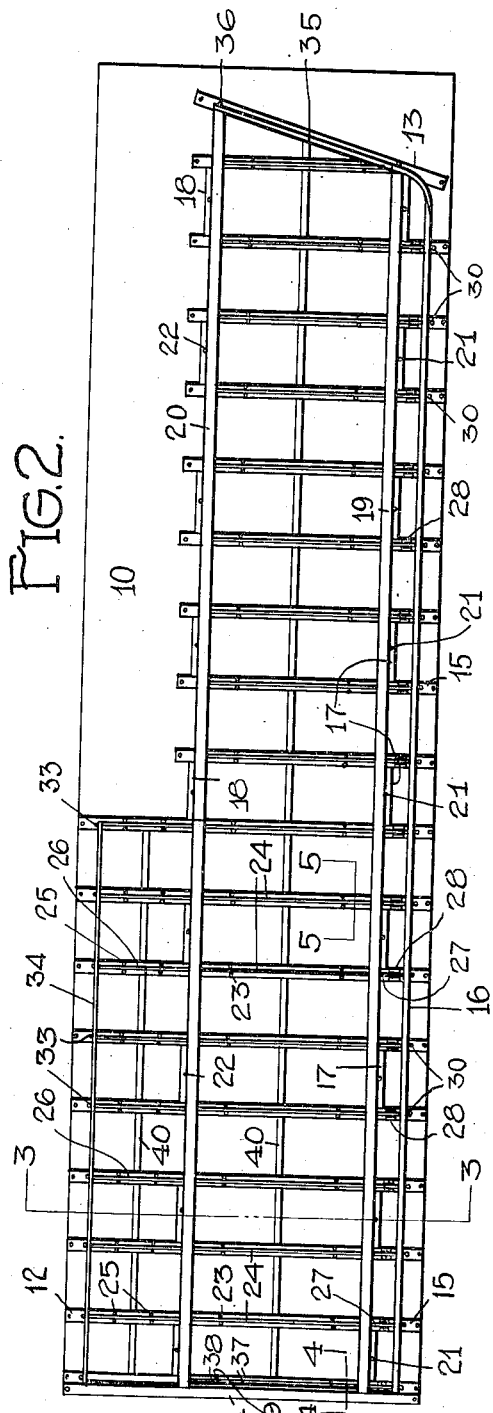
INVENTOR

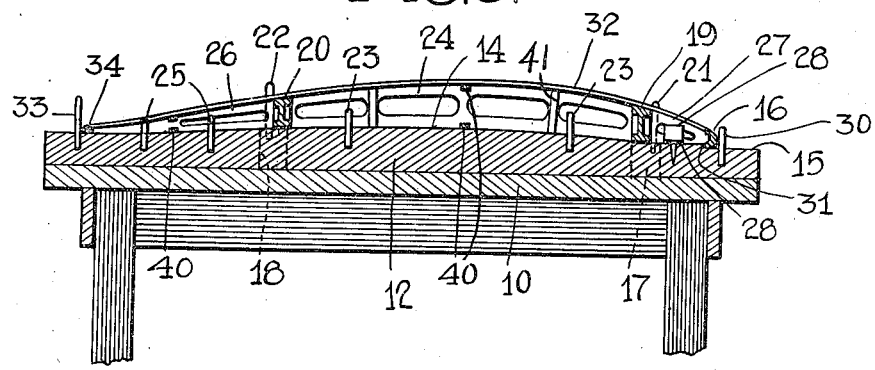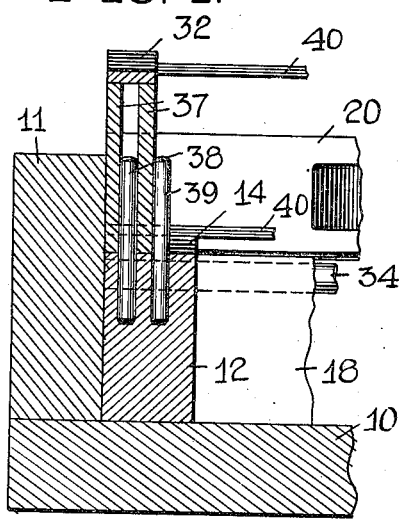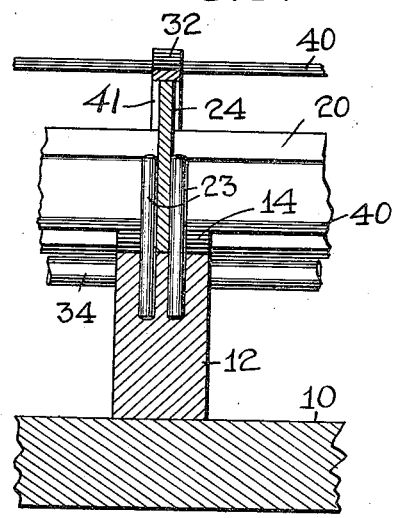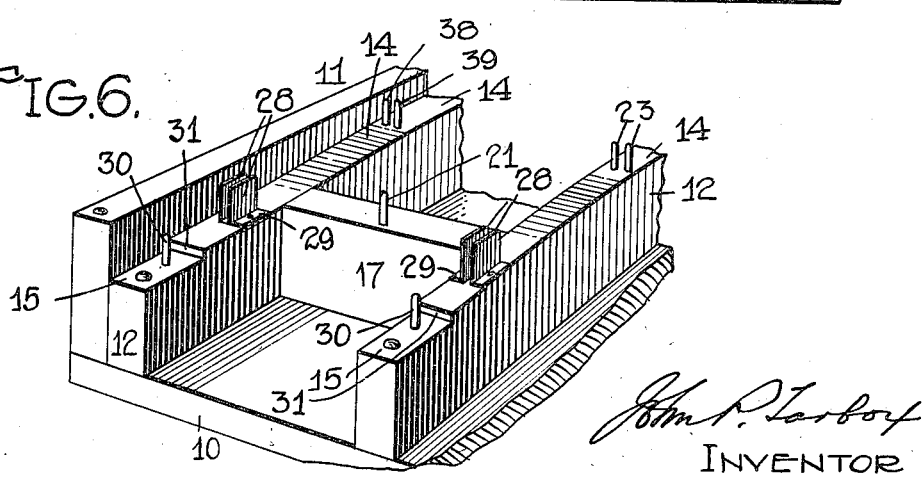

UNITED STATES PATENT OFFICE.

JOHN P. TARBOX, OF BUFFALO, NEW YORK, ASSIGNOR, BY MESNE ASSIGNMENTS, TO CURTISS AEROPLANE AND MOTOR CORPORATION, OF BUFFALO, NEW YORK, A CORPORATION OF NEW YORK.

ASSEMBLY-FORM FOR AEROPLANE-WINGS.

1,271,386.     Specification of Letters Patent.     Patented July 2, 1918.

Application filed December 15, 1915. Serial No. 66,912.

*To all whom it may concern:*

Be it known that I, JOHN P. TARBOX, a citizen of the United States, residing at Buffalo, in the county of Erie and State of New York, have invented certain new and useful Improvements in Assembly-Forms for Aeroplane-Wings, of which the following is a specification.

This invention relates to assembly forms for the wing panels of aeroplanes and as its particular object contemplates the provision of a form which may be relied upon for uniform and speedy assemblage of the wings according to the design which the form has been erected to transmit.

In modern aeroplane manufacture, each type or model has a special design of supporting surface which has been carefully determined upon as operating to the best advantage in connection with the other characteristics of design peculiar to that model or type of aeroplane. Once this wing design has been achieved, and the aeroplanes of that model are being manufactured in quantity, it will be realized that each succeeding wing panel must be made an exact replica of the first design, if the quality of the output is to be maintained at a uniformly high level, so that some accurate means must be resorted to for the assurance of exact correspondence in the wing panels successively manufactured.

It is, accordingly, contemplated by the present invention to provide an assembly form which shall be capable of transmitting characteristics of a particular wing design to every panel assembled thereon, without deviation at any point, and permitting the maximum speed on the part of the workmen engaged in the assembly process.

Stated more specifically, it is the intention of the invention to provide a wing panel form upon which all measurements for the correct alinement of spars, ribs, stringers and the like are accurately laid down at the beginning and thereafter fixed to obviate necessity for any manipulation or calculation on the part of the assembly workmen, while at the same time materially facilitating their work of assemblage according to a fixed plan which can result only in an increased production, the individual units of which possess identically similar properties.

It is a further object of the invention to provide a head block for the wing assembly form which shall correspond to the attaching edge of the completed wing, and to arrange in parallelism to said block a number of rib supports, each of which shall be fitted with means maintaining the rib webs placed thereon in absolute alinement, supporting them in such alinement without need for adjustment, and making proper provision for such characteristics of the design as the wing surface camber, the precise dimensional outlines of the wing, the flare of the end edge and the equipment of trailing edge ailerons.

The above and additional objects, to be hereinafter more specifically treated, are accomplished by such means as are illustrated in the drawings, described in the following specification and then more clearly pointed out in the claims, which are appended hereto and form a part of this application;

In the drawings, Figure 1 is a plan view of the assembly form comprehended by this invention;

Fig. 2 is a similar view of the form accommodating a wing which has been built thereon;

Fig. 3 is a transverse sectional view of the form taken on the plane indicated by the line 3—3 of Fig. 2;

Fig. 4 is an enlarged partial longitudinal sectional view taken through the form board of Fig. 2 on the line 4—4 of that figure, while Fig. 5 is a similar view taken on the typical section 5—5 of the same figure, and Fig. 6 is a view in partial perspective of a corner of the wing form, showing the head block and the rib supports adapted to accommodate the leading edge of the wing.

In preparing an assembly form in the manner proposed by this invention, a table 10 is provided of a length equaling or greater than the wing span and of a width equaling or greater than the chord thereof. At one end of this table and transversely thereto, there is erected the head block 11, a heavy piece of material presenting a plane surface which is normal to the length of the wing. Extending in parallelism to this block are a number of rib supports 12, one of which, as shown in Fig. 4, exists in abutting relation to the head block 11, while the remainder of the supports are equidistantly spaced from the head block to the wing tip support 13, which in the present instance intersects the outermost rib support. Each of the supports 12 is given the proper camber 14 for the under surface of its rib and each is also provided with a forward cutout corner or jog 15 which serves a purpose in connection with the attachment of the leading edge 16 of the wing which will later be more clearly set forth.

The members 12 of adjacent pairs are connected by forward cleats 17 which are in longitudinal alinement with the table 10 and normal to the head block 11, while rearwardly the same pairs of support members are similarly connected by cleats 18, the alinement of which is parallel to that of the first mentioned cleats. The members 17 will support the forward wing beam 19 while the rearward wing beam 20 will rest upon the rearward members 18 in the similar alinements thus established. Into the forward edges of the cleats 17 are driven pins 21 having an exact alinement normal to the head block 11 and of a height equal to that of the leading wing beam 19 which is adapted to be placed in contact with these alined pins as a means for determining its place in the wing structure. Pins 22 are carried at the rear edges of the cleats 18 to determine, in the same manner, the proper location of the rear wing beam, with the exception that the pins 22 extend above the wing beam which they guide in order that the workmen may readily remove them when a completely assembled wing panel is to be taken off the lay-out form. To facilitate this operation the pins 21 are on the forward side of their beam while the rear beam pins 22 are relatively oppositely placed.

Upon the rib supports 12 are to be arranged the web composing each rib, and such supports are equipped with pairs of fixed pins which are spaced a distance sufficient to admit of the entrance of the webs therebetween, such pins being carefully alined to determine an exact centering of each rib. Of these fixed pins those pairs denoted by the numerals 23 are employed to station the central rib web 24 between the wing beams, while those designated 25 aline with the central web, the tail webs 26. Nose webs 27 are not of sufficient length to permit of a pair of spaced pins at each extremity, as is the case with the other webs, so clips 28 are employed in their stead. Each of these clips comprises a thin metallic plate with a flanged base 29 for securement to the rib support, while mating clips are spaced in the same manner as the web pins, and offer a more extended surface which permits a single pair to reliably position its web.

Driven into the shouldered jog 15 of each rib support 12 is a fixed pin 30 which is spaced from the jog shoulder 31, the distance required for the accommodation therebetween of the nose strip 16 forming the leading edge of the wing. This strip 16 projects vertically beyond the nose webs 27 with which it contacts and is designed to abut the cap strips 32 which overlie both wing beams 19 and 20 and connect the three webs of each wing rib above and below. Until the lower surface cap-strip 32 is applied to each rib, which cannot be done until the wing is otherwise complete and inverted, the projecting portion of the leading edge must be accommodated in this shoulder jog of the rib support.

Removable pins 33 are adapted to engage the trailing edge 34 of the wing, although it will be apparent from inspection of Fig. 2 that this edge does not continue throughout the entire length of the wing, if an aileron is employed, as is here shown to be the case, to continue the streamline of the wing cross-section as the outer portion of the trailing edge. Such ailerons are secured directly to the rear wing beam 20 and accordingly do away with the tail webs at this point. The flared end edge 35 of the wing is adapted to rest during assemblage on the angled support 13 which carries adjacent its extremities the off center pins 36 against which the end edge 35 contacts when bent around into position.

Attention should also be directed to the opposite edge of the wing, which is assembled upon the rib support 12 abutting the head block. Since this is the securing edge between the wing and the engine panel of the aeroplane, or between two wings, double webs 37 are employed for strength without, however, increasing the number of alined pins, since the outermost of these pins, designated by the numeral 38, are spaced from the head block 11 the same distance that the inner pins 39 are spaced from them. By this arrangement one portion of the double web may be accommodated between the pins of each pair and the outer one between the outer pin of each pair and the head block.

Stringers 40 are employed in the usual nanner to connect all of the center webs 24 and the tail webs 26 longitudinally of the wing, while the vertical reinforcing strips 41 which extend between opposite cap-strips 32 of each wing rib, function in their usual manner. In this connection it will be noted that the details of the wing construction, such as the manner of removing central portions for lightness and also for the positioning of the trussing wires for the wing all follow the customary practice, this invention being concerned only with providing a satisfactory solution for the assemblage of wing structures in a manner which insures a maximum production and at the same time affords the even more important assurance that each successive structure is an accurate facsimile of those preceding.

A brief description of the manner of employing one of the assembly forms of this invention, should be a striking illustration of the combined speed and accuracy of assemblage which may be gained. Directing attention to Figs. 1 and 2, considering that all of the required material is at hand, the assembling process is begun by placing the center webs 24 in their proper sockets upon the rib supports as determined by the pairs of pins 23. The forward wing beam is then placed in contact with the pins 21 carried by the cleats 14 to abut one edge of this beam, and slid longitudinally until it contacts with the head block 11, or with a heavy side web which is often provided in some wing types. The rear wing beam is similarly placed in contact with its cleat pins 22 and may at once be positioned in the manner shown in Fig. 2. These beams and connecting webs, which form the backbone of the entire wing, are next securely fastened, which constitutes the first actual work which the laborer is called upon to furnish, all of the burden of calculating the assembly layout having been dispensed with. With the wing beams and center webs firmly fastened to each other, the nose webs and tail webs, where the latter are used, complete each of the wing ribs when positioned in proper clips 28 or pairs of pins 25 and are also secured to their wing beams. The trailing edge strip 34 is then fastened to the alined extremities of the tail webs while the nose strip 16 is similarly secured to the webs 27 and continued by the end edge 35 which is bent around into contact with the edge pins 36 and connected to the rear wing beam. The upper cap-strips 32 are next fastened over the webs composing each rib and lastly the longitudinal stringers 40 are inserted through suitable notches previously formed in each web. The pins 30 and 33 which respectively engage the trailing edge and the rear wing beam may then be removed in order that the wing may be quickly and easily inverted for the application of the lower cap-strips 32 and for the insertion of the lower stringers 40. Thus completed and after being equipped with the usual brace wires and waterproofed by varnish in the customary manner, the entire cross framework of the wing panel is ready for its fabric covering, having been easily assembled and in an exact manner which permits of no deviation from the accuracy demanded for efficiency's sake by the predetermined design incorporated into the assembly form.

It should now be apparent that the objects primarily presented have been attained by the construction disclosed in this application, so that it now remains but to point out that one embodiment only of the invention has been illustrated and described, and to emphasize the fact that later adaptations of this invention may be made in accordance with changing designs or the varying conditions concurrent with their adoption, when based on the foregoing and within the interpretation of the appended claims.

What is claimed is:

1. In an assembly form for aeroplane wings, a head block against which one end of the wing to be assembled is fitted and rib supports arranged in parallelism to said block to determine the position of said ribs in the wing.

2. In an assembly form for aeroplane wings, a head block, and wing rib supports, one of said supports being arranged to abut said head block.

3. In an assembly form for aeroplane wings, rib supports and means spaced longitudinally of each support to receive the webs composing each rib of a wing to be assembled.

4. In an assembly form for aeroplane wings, a head block against which one end of the wing is fitted, and wing-rib supports cambered in accordance with a surface of the wing, the placement of the support being such that the ribs are properly spaced parallel to the head block and at one side thereof only.

5. In an assembly form for aeroplane wings, a head block, wing rib supports arranged in parallelism to said block and cleats connecting pairs of adjacent supports.

6. In an assembly form for aeroplane wings, a head block, wing-rib supports mounted at one side of the head block and cleats connecting pairs of adjacent supports and approximately normal to said block.

7. In an assembly form for aeroplane wings, a head block, wing-rib supports mounted collectively at one side of the head block and alined cleats connecting certain supports to carry the longitudinal beams of the wings to be assembled.

8. In an assembly form for aeroplane wings, wing rib supports, cleats connecting pairs of said supports to carry the longitudinal beams of a wing to be assembled and means carried by each cleat to aline said beams thereon.

9. In an assembly form for aeroplane wings, wing-rib supports, cleats connecting said supports in alinement with the beams of a wing to be assembled, means carried by a number of said cleats to abut one side of one of said beams and means carried by other of said cleats to abut the other side of another of said beams.

10. In an assembly form for aeroplane wings, rib supports provided with shouldered jogs, adapted to accommodate the leading edge of the wing to be assembled and means positioned in each jog to engage the wing edge therebetween and the shoulder of the jog.

11. In an assembly form for aeroplane wings, spaced members forming longitudinal alinements, members providing alinements intersecting with those first mentioned and means carried by respective members to engage the intersecting framework of an aeroplane wing.

12. In an assembly form for aeroplane wings, wing-rib supports, cleats connecting the supports and pins carried by said cleats to secure alinement of the longitudinal beams of a wing to be assembled.

13. In an assembly form for aeroplane wings, rib supports, cleats connecting said supports and adapted to carry the longitudinal beams of a wing to be assembled, and alining pins carried by said rib supports and said cleats.

14. In an assembly form for aeroplane wings, wing-rib supports, cleats connecting said supports to provide alinements for the beam of a wing to be assembled, pins fixed to the cleats of one alinement and pins removably associated with the cleats of another alinement for positioning contact with respective beams.

15. In an assembly form for aeroplane wings, a support, cleats providing alinement for the beams of a wing to be assembled, fixed means carried by the cleats of one alinement and removable means carried by the cleats of a second alinement for positioning contact with their respective beams.

16. In an assembly form for aeroplane wings, rib supports, pins arranged in pairs on each support for engagement with the webs composing the ribs of an aeroplane wing and clips also carried by said supports for a similar engagement.

17. In an assembly form for aeroplane wings, a head block, rib supports, one of said supports abutting said block, pairs of spaced means carried by said support for engagement with the aeroplane wing to be assembled, the means of said abutting support being adapted to co-act with said head block to secure the end double web of said wing.

18. In an assembly form for aeroplane wings, rib supports, pairs of spaced devices carried by said supports to engage the ribs of an aeroplane wing, and a head block abutting one of said supports and spaced from one of each pair of said devices, a distance equal to the spacing of the pair itself.

19. In an assembly form for aeroplane wings, intersecting spaced and alined supports, a frame structure for the wing adapted to be assembled thereon, means on said supports to maintain the structural pieces of said wing during assemblage, and means for maintaining the wing in its entirety upon the form.

20. The combination with the cross framework of an aeroplane wing, of an assembly form for said framework including intersecting spaced and alined supports, means carried by said supports to maintain the structural pieces during assemblage, a head block for contacting with one side of the assembled wing structure, and means for engaging the wing perimetrically to maintain the wing as a whole against said block, said last mentioned means being sufficiently removable to permit removal of the completed wing.

21. In an assembly form for aeroplane wings, a support, abutments mounted upon the support to engage with the marginal frame elements of the wing, and alined abutments mounted in intersecting series upon said support to engage the intersecting frame elements of the wing.

In testimony whereof I affix my signature.

JOHN P. TARBOX.